(12) United States Patent
Valdez

(10) Patent No.: US 12,328,540 B2
(45) Date of Patent: *Jun. 10, 2025

(54) FIBER DISTRIBUTION TERMINAL WITH IN-LINE DIAGNOSTIC TOOL IN PASSIVE OPTICAL NETWORKS

(71) Applicant: FRONTIER COMMUNICATIONS HOLDINGS, LLC, Dallas, TX (US)

(72) Inventor: John Valdez, Copper Canyon, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,099

(22) Filed: Dec. 2, 2024

(65) Prior Publication Data

US 2025/0097613 A1    Mar. 20, 2025

Related U.S. Application Data

(63) Continuation of application No. 18/651,679, filed on Apr. 30, 2024, now Pat. No. 12,273,666, which is a
(Continued)

(51) Int. Cl.
  *H04Q 11/00*  (2006.01)
(52) U.S. Cl.
  CPC . *H04Q 11/0067* (2013.01); *H04Q 2011/0079* (2013.01); *H04Q 2213/1301* (2013.01)
(58) Field of Classification Search
  CPC ....... H04Q 11/0067; H04Q 2011/0079; H04Q 2213/1301; H04Q 2011/0083; H04Q 2011/0084; H04Q 2011/0015; H04B 10/272; H04B 10/27; H04B 10/0771; H04B 10/0791; H04B 10/0775; H04B 10/0779; H04B 10/0795; H04B 10/40; H04B 10/29; H04B 10/07955; H04B 10/0777; H04B 10/0773; H04B 10/073; H04B 10/0731; H04B 10/07; H04B 17/15; H04B 17/16
  See application file for complete search history.

(56) References Cited

U.S. PATENT DOCUMENTS 8,655,167 B1 * 2/2014 Lam .................... H04J 14/0227
                                                    398/16
10,491,296 B1 * 11/2019 Wellbrock ........... H04B 10/073
(Continued)

*Primary Examiner* — Hibret A Woldekidan
(74) *Attorney, Agent, or Firm* — MARSHALL, GERSTEIN & BORUN LLP

(57) ABSTRACT

The techniques described herein are directed to an in-line diagnostic tool of a PON that optically couples a first component of the PON and a second component of the PON. The tool detects incoming optical signals (e.g., of different services) received from the first PON component and passes the optical signals through the tool to the second PON component. The in-line diagnostic tool is configured to detect one or more conditions of the incoming optical signals, the PON, and/or sub-components of the tool, perform one or more diagnostic and/or analytics routines, and generate and transmit a diagnostic signal including information indicative of the detected conditions and/or the results of the diagnostic and/or analytics routines to be transmitted via one or more output interfaces of the in-line diagnostic tool to recipient devices and/or applications.

30 Claims, 3 Drawing Sheets

Related U.S. Application Data continuation of application No. 18/140,224, filed on Apr. 27, 2023, now Pat. No. 11,997,437.

(56) References Cited

U.S. PATENT DOCUMENTS

| | | | |
|---|---|---|---|
| 11,906,389 B1* | 2/2024 | Perron | H04B 10/071 |
| 2007/0242954 A1* | 10/2007 | Sackman | H04J 14/02 |
| | | | 398/71 |
| 2008/0008469 A1* | 1/2008 | Yokoyama | H04J 14/0295 |
| | | | 398/16 |
| 2016/0277102 A1 | 9/2016 | Kim et al. | |
| 2017/0005723 A1* | 1/2017 | Prause | H04B 10/07 |
| | | | 398/71 |
| 2020/0300449 A1* | 9/2020 | Parfitt | F21V 23/0435 |
| 2022/0216916 A1* | 7/2022 | Compann | H04B 10/0731 |
| 2024/0280758 A1* | 8/2024 | Kawano | G02B 6/3588 |

\* cited by examiner

FIBER DISTRIBUTION TERMINAL WITH IN-LINE DIAGNOSTIC TOOL IN PASSIVE OPTICAL NETWORKS

CROSS-REFERENCE TO RELATED APPLICATIONS

The present application is a continuation of U.S. patent application Ser. No. 18/651,679 entitled "Fiber Distribution Terminal with In-Line Diagnostic Tool in Passive Optical Networks" and filed Apr. 30, 2024, which is a continuation of U.S. patent application Ser. No. 18/140,224 entitled "In-Line Diagnostic Tool in Passive Optical Networks" filed on Apr. 27, 2023, and which issued as U.S. Pat. No. 11,997,437, the disclosures of which are hereby incorporated by reference herein in their entireties.

Additionally, this application is related to U.S. patent application Ser. No. 18/140,385 entitled "Passive Optical Network Adaptor with Wireless Interface," which was filed on Apr. 27, 2023, and issued as U.S. Pat. No. 11,936,424, the disclosure of which is incorporated herein in its entirety.

FIELD OF THE DISCLOSURE

This disclosure relates generally to in-line diagnostic tools in passive optical networks.

BACKGROUND

A conventional passive optical network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

A PON can support multiple types of services, each of which may utilize a different optical wavelength band for delivery of its signals. That is, signals of different services which utilize different optical wavelength bands as carriers may be transmitted and received across the PON using the same PON infrastructure components (e.g., optical fibers, OLTs, FDHs, LMTUs, etc.). Examples of these different services can include RF (Radio Frequency) Video and IPTV (Internet Protocol television), to name a few.

To support the delivery of different services to end-point locations of the PON (e.g., customer premises, or other physical locations that are serviced by the PON), in-line adaptors may be utilized. An in-line adaptor may be disposed proximate to or at the location of an LMTU, and may be optically disposed in between LMTU and the incoming optical fiber that optically connects the LMTU with the PON. That is, the in-line adaptor couples (e.g., directly couples) the incoming optical fiber of the PON (e.g., the distribution optical fiber) and the LMTU and, as such, the "in-line adaptor" of the PON is interchangeably referred to herein as a "coupling device" or an "in-line coupling device" of or associated with the LMTU. Generally speaking, the in-line adaptor may receive the incoming optical fiber of the PON, monitor for and detect the incoming optical signals that are being delivered over the incoming optical fiber on different wavelength bands, and provide the incoming optical signals to the LMTU via appropriate output interfaces and channels, optical or otherwise. For example, an in-line adaptor may monitor a first wavelength band of the incoming optical fiber (e.g., 1553-1565 nm) to detect any RF Video signals being carried thereon, convert the detected RF Video signals to QAM (Quadrature Amplitude Modulation) or other suitable RF signals, and transmit the RF signals to the LMTU, e.g., via a suitable wired interface such as a wired RF output. Simultaneously, the add-on adaptor may pass-through any IPTV signals being carried on a second set of wavelength bands over the incoming optical fiber (e.g., 1260-1542 nm and 1573-1650 nm) to the LMTU, e.g., via an optical interface or optical output. In many cases, in-line adaptors may be utilized at selected service locations to enable the PON 100 to deliver, via the PON infrastructure, multiple types of services to endpoint service locations, while insulating (and in some cases, preventing) such services from being compromised due to optical drift.

SUMMARY

The systems, methods, devices, and techniques described within this disclosure are directed to an in-line diagnostic tool that is disposed, in-line, between two components of a PON and is configured to receive, from one of the two components, optical signals at a first optical interface and provide the received optical signals to the other one of the two components via a second optical interface. The two components may be, for example, an OLT and an FDH, an OLT and an FDT, an FDH and an LMTU, an FDT and an LMTU, or any other pair of components of the PON between which optical signals are delivered. As such, in various embodiments, the in-line diagnostic tool may be included in an in-line adaptor of a LMTU of the PON, the in-line diagnostic tool may be included in an FDH, FDT, or other component of the PON, or the in-line diagnostic tool may be a stand-alone component of the PON. The in-line diagnostic tool may detect, at a first optical interface of the tool, incoming optical signals which are being delivered to the tool from a first component via an incoming optical fiber received at the first optical interface. The tool may pass at least a portion of the received, incoming optical signals through the tool to the second component, e.g., via a second optical interface of the tool. In some cases, the in-line tool may convert at least another portion of the incoming optical signals from utilizing the frequency band and/or wavelength band via which the incoming optical signals were received at the tool to utilizing a different frequency band and/or wavelength band for transmission from the tool to the recipient component, such as when the tool is implemented in an in-line adaptor servicing an LMTU that provides multiple different services at the location at which the LMTU is disposed.

Advantageously, the in-line diagnostic tool includes one or more sensors via which the tool senses or detects one or more conditions associated with the received optical signals. The in-line diagnostic tool may generate a diagnostic signal that includes information indicative of the detected one or more conditions, and the in-line diagnostic tool may transmit the diagnostic signal to one or more recipient devices, e.g., via the first optical interface, the second optical interface, a wired radio frequency (RF) communication interface, and/or a wireless RF communication interface.

In an embodiment, an in-line diagnostic tool utilized in a passive optical network (PON) includes a first optical interface via which an optical fiber of the PON is received at the in-line diagnostic tool and via which the in-line diagnostic tool receives at least one optical signal. The in-line diagnostic tool also includes a second optical interface that optically couples the in-line diagnostic tool to a PON component that is a recipient of the at least one optical signal. Additionally, the in-line diagnostic tool includes one or more sensors that detect one or more conditions associated with the at least one optical signal, and one or more processors operable to cause a diagnostic signal including information indicative of the detected one or more conditions to be generated and transmitted from the in-line diagnostic tool via an output interface of the in-line diagnostic tool.

In an embodiment, a method at an in-line diagnostic tool utilized in a passive optical network (PON) includes obtaining, by the in-line diagnostic tool, at least one optical signal via a first optical interface of the in-line diagnostic tool via which an optical fiber is received; and providing, via a second optical interface of the in-line diagnostic tool, the at least one optical signal to a component of the PON that is a recipient component of the at least one optical signal. The method further includes detecting, via one or more sensors of the in-line diagnostic tool, one or more conditions of the at least one optical signal; and generating, by the in-line diagnostic tool, a diagnostic signal including information indicative of the detected one or more conditions. Additionally, the method includes causing, by the in-line diagnostic tool, the diagnostic signal to be transmitted from the in-line diagnostic tool via an output interface of the in-line diagnostic tool.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
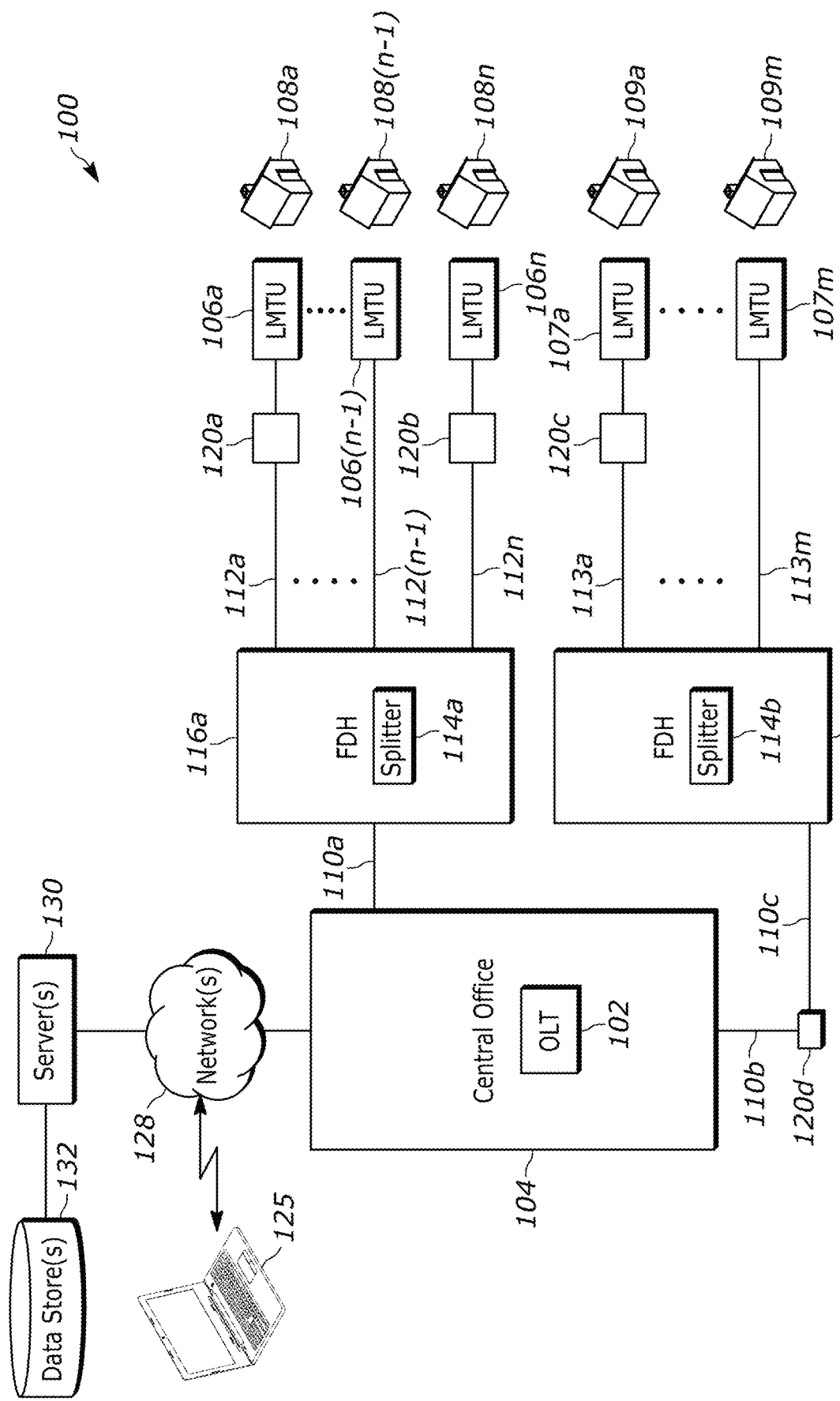
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units (LMTUs) 106a, . . . , 106n at respective customer premises 108a, . . . , 108n. The last mile termination units 106a, . . . , 106n may be located outside and/or inside the customer premises or locations 108a, . . . , 108n. Each last mile termination unit 106a, . . . , 106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, . . . , 106n via respective distribution optical fibers 112a, . . . , 112n (which are interchangeably referred to herein as "F2 optical fibers 112a, . . . , 112n" or "secondary optical fibers 112a, . . . , 112n"). In the illustrated example, the first feeder optical fiber 110a is optically coupled to the plurality of last mile termination units 106a, . . . , 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, . . . , 108n are proximally close to the FDH 116a, and typically each of the customer premises 108a, . . . , 108n and respective last mile termination units 106a, . . . , 106n is disposed at a different optical distance from the FDH 116a. An "optical distance," as generally utilized herein, refers to a distance over which an optical signal travels or is delivered. In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110b, 110c from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m.

Notably, the PON 100 depicted in FIG. 1 includes in-line diagnostic tools 120a-120d. In-line diagnostic tools 120a-120c are respectively located at or proximate to endpoint service locations 108a, 108n, and 109a, and in-line diagnostic tool 120d is optically disposed between the OLT 102 and the FDH 116b. As shown in FIG. 1, each in-line diagnostic tool 120a-120c is optically connected to the PON 100 via a respective optical fiber 112a, 112n, and 113a and is optically connected (and in some cases, also is communicatively connected via wired and/or wireless links, not explicitly illustrated in FIG. 1) to respective LMTUs 106a, 106n, and 107a. Generally, the connections between the in-line diagnostic tools 120a-120c and respective LMTUs 106a, 106n, and 107a are direct connections.

In some situations, one or more of the in-line diagnostic tools 120a-120c may be included in a respective in-line adaptor associated with a respective LMTU 106a, 106n, and 107a, such as in an embodiment of an in-line adaptor discussed in related, co-pending U.S. patent application Ser. No. 18/140,385 entitled "Passive Optical Network Adaptor with Wireless Interface". In these situations, the in-line diagnostic tools 120a-120c may enable multiple types of services to be delivered via the infrastructure of the PON 100 to the respective endpoint service locations 108a, 108n, and 109a, e.g., without requiring the physical LMTUs 106a, 106n, 107a to be retrofitted to support the multiple types of services, and to provide the technical benefit of insulating (and in some cases preventing) various services from being compromised due to optical drift. For example, the in-line diagnostic tools 120a-120c may enable both IPTV and RF Video to be delivered to the endpoint service locations 108a, 108n, and 109a while insulating RF Video services from adversely being affected by optical drift.

In some situations, an in-line diagnostic tool may be unassociated with only a single LMTU and may not be included in any in-line adaptor associated with a particular LMTU. For example, as shown in FIG. 1, the in-line diagnostic tool 120d is optically disposed between the OLT 102 and the FDH 116b. That is, the in-line diagnostic tool 120d is optically connected to the OLT 102 via optical fiber 110b and is optically connected to the FDH 116b via optical fiber 110c. Accordingly, the term "in-line diagnostic tool" is interchangeably referred to herein as a "coupling device" of the PON 100, as the in-line diagnostic tool can optically couple two components (e.g., physical components) of the PON. A more detailed description of the in-line diagnostic tools 120a-120d is provided elsewhere within this disclosure.

As utilized herein, the "components" of the PON 100 generally refer to the devices, nodes, and optical fibers of the PON 100. For example, the components of the PON 100 shown in FIG. 1 may include the OLT 102, the FDHs 116a, 116b, the splitters 114a, 114b, the LMTs 106a-106n and 107a-107m, the in-line diagnostic tools 120a-120d, and the optical fibers interconnecting the devices or nodes, e.g., the optical fibers 110a-110b, 112a-112n, and 113a-113m.

In some scenarios, an optical terminal (e.g., the OLT 102 and/or one or more the last mile termination units 106a-106n, 107a-107m) may transmit optical test signals and/or patterns, indication light, and/or other types of measurement signals into an optical fiber in response to control signals received from a computing device. For example, the OLT 102 and/or the one or more LMTUs 106a-106n, 107a-107m may receive control signals from a computing device 125 (e.g., a laptop, a computer, a tablet, a mobile phone, etc.) associated with a service technician or other agent of the PON 100. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1). Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

Various information and data associated with, utilized by, and/or generated by the PON 100 may be stored in the data stores 132 of the PON 100. For example, the data store(s) 132 may store records of customer contact events with a technical support organization supporting the PON 100, service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

Example In-Line Diagnostic Tool

Figure 2:
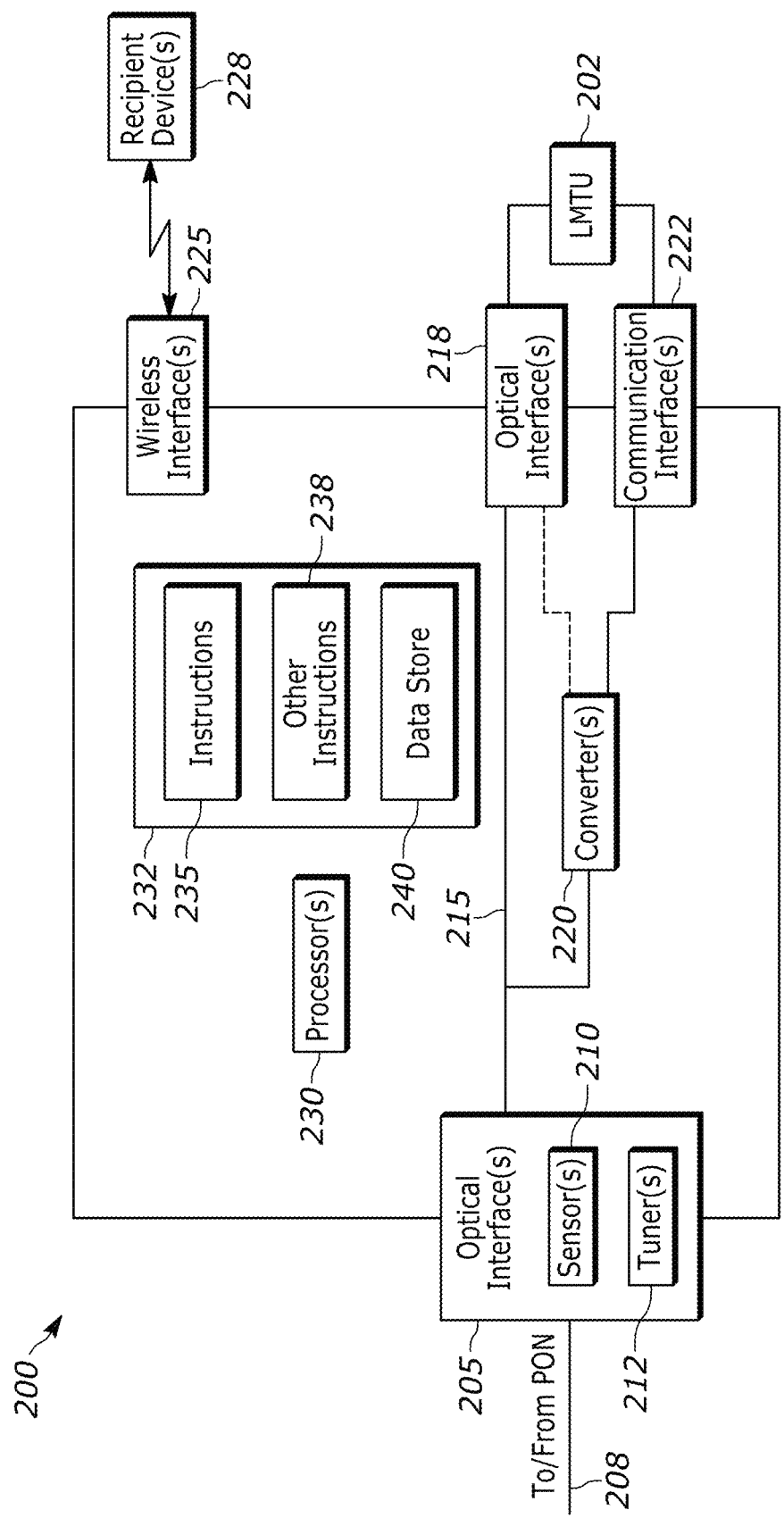
FIG. 2 is a block diagram of an example in-line diagnostic tool that is in accordance with the techniques discussed herein and that may be included in the PON of FIG. 1.

FIG. 2 is a block diagram representative of an example in-line diagnostic tool 200 (which is referred to interchangeably herein as a coupling device 200) which may be utilized in a passive optical network. For example, the in-line diagnostic tool 200 may be the in-line diagnostic tool 120a, 120b, 120c, and/or 120d of the example PON 100 depicted in FIG. 1, or the in-line diagnostic tool 200 may be another in-line diagnostic tool utilized in the PON 100 or utilized in another PON. For ease of illustration, and not for limitation purposes, the in-line diagnostic tool 200 is described with simultaneous reference to the PON 100.

As depicted in FIG. 2, the example in-line diagnostic tool 200 is physically disposed in between the PON 100 and a last mile termination unit (LMTU) 202 and optically connects the LMTU 202 with the PON 100. As such, in FIG. 2 the in-line diagnostic tool 200 physically couples the LMTU 202 and the PON 100; however, this embodiment is for illustration (and not limitation) purposes only. Indeed, an in-line diagnostic tool 200 can respectively and optically couple numerous of other types of PON components, including PON components that are not physically disposed at last mile service locations. For example, the in-line diagnostic tool 200 can physically couple an OLT and an FDH, an OLT and an FDT, an FDH and an LMTU, an FDT and an LMTU, or any other pair of components of the PON between which optical signals are delivered (not shown in FIG. 2).

At any rate, the in-line diagnostic tool or coupling device 200 may include an optical interface 205 (e.g., a "network-facing" optical interface 205) that receives an optical fiber 208 of the PON 100 (e.g., an "incoming" or "distribution" optical fiber 208). The incoming optical fiber 208 may optically connect the diagnostic tool 200 (and, thus, the LMTU 202, in the embodiment illustrated in FIG. 2) to the PON 100, e.g., directly with the OLT 102, to the OLT 102 via a fiber distribution hub 116a, 116b that is optically connected to the OLT 102, etc. Generally speaking, the diagnostic tool 200 may receive, via the incoming optical fiber 208, optical signals that are transmitted from the PON 100 for delivery to the LMTU 202, where said optical signals may include content of various services that are delivered via the PON 100 for reception by the LMTU 202. The received service content may include payload of services, signaling for the services, metadata for the payload and signals of the service, etc. For example, the optical signals received at the diagnostic tool 200 via the optical fiber 208 and the network-facing optical interface 205 may include payload data and signaling/metadata for IPTV services, RF video services, and/or other services that are delivered over the PON 100. Generally, different services may be delivered over the PON 100 by utilizing respective bands of optical wavelengths supported by the PON 100. In an example implementation, a first service may utilize optical wavelength bands 1260-1543 nm and 1573-1650 nm for delivery of its respective payload and signaling content, and a second service may utilize optical wavelength bands 1553-1565 nm for delivery of its respective payload and signaling content. Of course, other services may utilize other respective optical wavelength bands.

In some implementations, in addition to payload and signaling/metadata of provided services, optical signals that are transmitted from the PON 100 for delivery to the LMTU 202 via the incoming optical fiber 208 and the in-line diagnostic tool 200 may include signaling and/or information pertaining to the PON 100 itself and/or to components of the PON 100 (e.g., signaling and information other than the signaling and information of the delivered services). For example, the server(s) 130, the portable computing device 125, and/or the OLT 102 may send optical control signals, optical test signals, etc. to the LMTU 202 via the optical fiber 208 and the in-line diagnostic tool 200. Said non-service-specific signals may be delivered over the same or different wavelength bands as those utilized to provide services to the LMTU 202. Indeed, the PON 100 (including the incoming optical fiber 208) may support a plurality of optical wavelength bands including, for example: 100-400 nm, 630-670 nm, 1260-1280 nm, 1284-1288 nm, 1290-1310 nm, 1340-1344 nm, 1356-1360 nm, 1530-1565 nm, 1575-1581 nm, 1596-1603 nm, and/or 1613-1650 nm, to name a few, at least some of which may be utilized to provide signaling and/or information/content of services to endpoint locations, and at least some of which may be utilized to provide non-service signaling and/or information/content to endpoint locations.

As shown in FIG. 2, the network-facing optical interface 205 of the in-line diagnostic tool 200 may include one or more sensors 210, each of which detects or senses the presence of (and, optionally, one or more conditions relating to) optical signals which are being delivered to the LMTU 202 via different optical wavelength bands over the incoming optical fiber 208. The one or more sensors 210 may include multiple, separate sensors. Different sensors may detect the presence and/or conditions of optical signals on different bands of wavelengths, and/or the one or more sensors 210 may include an integral sensor which is configured to detect the presence and/or conditions of optical signals on multiple, different wavelength bands. As such, in some embodiments, the network-facing optical interface 205 may include one or more tuners 212 (e.g., which may include one or more auto-tuners) that automatically tune the optical interface 205 to various wavelength bands on which incoming optical signals are detected. In some implementations, the tuner 212 may also adjust (e.g., may automatically adjust) an incoming optical signal based on any optical drift of the incoming optical signal. Data generated by the sensor(s) 210 may include one or more measurements of the optical signal, and/or may be indicative of one or more sensed or measured conditions of the optical signal or otherwise related to the optical signal.

Generally speaking, optical signals that are received at the optical interface 205 of the in-line diagnostic tool 200 via certain or selected wavelength bands of the PON 100 may be passed through 215 the diagnostic tool 200, e.g., from the network-facing optical interface 205 through 215 the diagnostic tool 200 to a local-facing optical interface 218 to the LMTU 202. As utilized herein, a "passed-through" optical signal is an optical signal that is delivered from the network-facing optical interface 205 to the local-facing optical interface 208 without being processed, or with minimal processing. Such signals may include optical signals that the PON 100 utilizes to provide optical-based services to the LMTU 202. For example, the PON 100 may provide content (e.g., payload and signaling/metadata) of IPTV services to the LMTU 202 by utilizing optical light in the 1260-1543 nm and 1573-1650 nm wavelength bands and, as such, optical light of these wavelength bands may be passed through 215 to the LMTU 202 (e.g., via the local-facing optical interface 218 to which the LMTU 202 is directly connected). In some embodiments, the network-facing optical interface 205 may pass through 215 any PON-related optical signals that do not include content of the provided services (e.g., that are not payload and signaling/metadata of the provided services). For example, the PON 100 may provide control signals, test signals, etc. that are generated by the server(s) 130, the agent computing device 125, the OLT 102, etc. to the LMTU 202 and that are related to the testing, performance, and administration of various PON components by utilizing optical light in the 1260-1543 nm and 1573-1650 nm wavelength bands and, accordingly, such PON-related signals may also be passed through to the LMTU 202. Accordingly, the optical wavelength bands over which the diagnostic tool 200 receives and passes through 215 optical signals to the LMTU 202 are generally and interchangeably referred to herein as "PON operating wavelength bands," "operating wavelength bands of the PON," or "operating wavelength bands."

In some situations, the sensor 210 may detect an incoming optical signal of a service that is being carried on an optical wavelength band other than the operating wavelength bands of the PON 100. In these situations, the in-line diagnostic tool 200 may tune 212 to the other optical wavelength band and convert the detected optical signal (e.g., by using a converter 220) into a waveform or other suitable transmission signal of an electromagnetic frequency band for delivery to the LMTU 202. For example, the sensor 210 may detect that an RF Video signal is being delivered over the incoming optical fiber 208 via an optical carrier of a 1553-1565 nm wavelength band. In this example, the in-line diagnostic tool 200 may tune (e.g., auto-tune 212) to the 1553-1565 nm wavelength band and may utilize the converter 220 to convert the optical signal into a QAM (Quadrature Amplitude Modulation) signal. The diagnostic tool 200 may then deliver the converted signal to the LMTU 202 via a corresponding local-facing communication interface 222 to which the LMTU 202 is directly connected.

The wavelength bands over which optical signals are to be passed through 215 the in-line diagnostic tool 200 to the LMTU 202 and/or the wavelength bands over which optical signals are to be converted 220 prior to being delivered to the LMTU 202 may be pre-determined or pre-configured. In some embodiments, the in-line diagnostic tool 200 may discover the identities of the wavelength bands over which optical signals are to be passed through 215 and/or the identities of the wavelength bands over which optical signals are to be converted 220, for example, based on an identity of the LMTU 202 (e.g., such as a stock-keeping unit (SKU) of the LMTU 202, a global identifier of the LMTU 202, or other suitable identifier of the LMTU 202). The diagnostic tool 200 may obtain the identity of the LMTU 200 from the LMTU 202 upon communicatively connecting with the LMTU 200, or the diagnostic tool 200 may obtain the identity of the LMTU 200 from the PON 100, for example. Additionally or alternatively, the in-line diagnostic tool 200 may discover or learn the identities of the wavelength bands over which optical signals are to be passed through 215 and/or the identities of the wavelength bands over which optical signals are to be converted 220 based on an instruction received from the PON 100 via the incoming fiber 208, and/or based on an instruction received via another interface of the diagnostic tool 200, such as the interfaces 218, 222, and/or 225. The identities of the wavelength bands over which optical signals are to be passed through 215 and/or the identities of the wavelength bands over which optical signals are to be converted 220 may be modified and/or updated, when desired.

Although FIG. 2 depicts the diagnostic tool 200 as having a single converter 220 and a single local-facing communication interface 222, this is only for the purposes of ease of illustration and discussion. In embodiments, the diagnostic tool 200 may include a plurality of converters 220 and a plurality of communication interfaces 222 via which converted optical signals may be delivered to the LMTU 202. For instance, different ones of the plurality of converters 220 and the plurality of communication interfaces 222 may support different frequencies and/or wavelengths of electromagnetic waves, different encoding and/or modulation techniques, etc. Typically, but not necessarily exclusively, such communication interfaces local-facing 222 may include one or more wired communication interfaces. In some embodiments, though, the diagnostic tool 200 may convert an incoming optical signal received via one optical wavelength band to another optical wavelength band for delivery to the LMTU 202, e.g., via the optical interface 218.

It is noted that in embodiments in which the in-line diagnostic tool 200 optically couples two components of the PON and neither one of the two components is an LMTU 106, 107, the optical signals that are received by the in-line diagnostic tool 200 from the upstream (e.g., network-facing) optical component via the incoming optical interface 205 may be passed through the tool 200 and provided to the downstream (e.g., service location-facing) optical component via the optical interface 218.

Further, as depicted in FIG. 2, the in-line diagnostic tool 200 may include one or more wireless interfaces 225 which the in-line diagnostic tool 200 can utilize to wirelessly transmit messages and/or signals to one or more devices 228 other than the LMTU 202, and/or to wirelessly receive messages and/or signals from the one or more other devices 228. The one or more other devices 228 may include, for example, wireless devices such as a portable computing device 125 (e.g., that is being utilized by an agent of the PON), another in-line diagnostic tool of the PON 100 coupling another LMTU to the PON 100, another component of the PON 100, a router or node included in a wireless network of which the diagnostic tool 200 is also a node, etc. The one or more wireless interfaces 225 may include respective wireless transceivers and radios which operate at various radio frequency (RF) wireless communication frequency bands such as, for example, 900 MHZ, 2.5 GHZ, and 5.2 GHZ, and/or other RF communication frequency bands such as those used for Wi-Fi, near-field communications (NFC), Bluetooth, infrared, etc., to name a few.

Generally, messages and/or signals transmitted by the in-line diagnostic tool via the wireless interface(s) 225 may include information that the in-line diagnostic tool 200 has sensed, detected, or otherwise determined with respect to the PON 100, with respect to the optical signals received at the diagnostic tool 200 via the PON 100, and/or with respect to the sub-components of the diagnostic tool 200. Particularly, the payload of the messages and/or signals transmitted by the in-line diagnostic tool 200 may include information indicative of diagnostic data, diagnostic results, diagnostic statuses, scheduled diagnostics, and/or other information associated with diagnostics which the in-line diagnostic tool has performed, is going to perform, and/or is able to perform. Accordingly, and as shown in FIG. 2, the in-line diagnostic tool 200 may include one or more processors 230 and one or more tangible, non-transitory memories 232 storing a set of computer-executable instructions 235 that are executable by the one or more processors 230 to cause the diagnostic tool 200 to sense and/or detect conditions of the optical signals, the PON, and/or the sub-components of the tool 200, perform one or more diagnostic routines related to the conditions, generate a signal indicative of information associated with the one or more diagnostic routines, and cause the signal to be transmitted from the diagnostic tool 200 via the wireless interface 225 to one or more wireless devices 228. For example, the set of computer-executable instructions 235 may be executable by the one or more processors 230 to cause the diagnostic tool 200 to sense, detect, and otherwise determine statuses, aspects, and/or characteristics of the optical light being received at the diagnostic tool 200 via the network-facing optical interface 205, of optical light and other signals being provided by the diagnostic tool 200 to the LMTU 202 or downstream optical component (e.g., via the local-facing interfaces 218, 222), and/or of sub-components of the in-line diagnostic tool 200, perform one or more diagnostics on the statuses, aspects, and/or characteristics of the optical light, and to cause one or more signals related to the one or more diagnostics to be transmitted from the diagnostic tool 200 via the wireless interface 225 to one or more wireless devices 228. Generally speaking, the machine-readable instructions 235 stored in the memories 232, when executed by the processors 230, may cause the in-line diagnostic tool 200 to perform at least some of the operations represented by embodiments of the methods described in this disclosure. Of course, the processors 230 may execute other machine-readable instructions 238 stored on the memories 232, and the example processors 230 may also interact with the memories 232 to store data 240 such as data formed or used during execution of the machine-readable instructions 235 and/or the other machine-readable instructions 238 stored on the memories 232.

The one or more processors 230 may be implemented using hardware, and may include a semiconductor based (e.g., silicon-based) or other suitable type of device. The one or more processors 230 may include, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the one or more processors 230 may be a field programmable gate array (FPGA), an application specific integrated circuit (ASIC), etc. that implements operations of the example methods described herein without executing instructions The one or more memories 232 are accessible by the one or more processors 230 (e.g., via a memory controller). Example memories 232 include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions 235, 238 corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the in-line diagnostic tool 200 to provide access to the machine-readable instructions stored thereon.

In some embodiments, the computer-executable instructions 235 executing at the diagnostic tool 200 may obtain information from the LMTU 202, and cause the information obtained from the LMTU 202 to be transmitted from the diagnostic tool 200 via the wireless interface 225 and/or via the network-facing optical interface 205. For example, upon communicatively connecting with the LMTU 202, the LMTU 202 may transmit its identification to the diagnostic tool 200, e.g., via one of the local-facing interfaces 218, 222, 225. The (self-) identification of the LMTU 202 may be, for example, an identifier that uniquely identifies the LMTU 202 within the PON 100 and/or an identifier of the LMTU 202 that is globally unique (e.g., across multiple PONs). For instance, the unique identifier of the LMTU 202 may be based on a serial number of the LMTU 202, a MAC address of the LMTU 202, an identifier or other suitable indication of the PON 100 with respect to the Full Service Access Network (FSAN) or other association of operator companies of PONs, and/or GPS (Global Positioning System) or other geospatial coordinates of the LMTU 202. Further, the (self-) identification of the LMTU 202 may be of any suitable format, for example, an NFC or other type of RFID tag or encoded format. For example, the diagnostic tool 200 may obtain the identification of the LMTU 202 via passive means (e.g., by reading an NFC tag, by obtaining information that is published or broadcast by the LMTU 202, etc.) or via active means (e.g., by directly querying the LMTU 202).

The diagnostic tool 200 may transmit the identification of the LMTU 202 to the OLT 102 and/or to the servers 130 of the PON 100 via the network-facing optical interface 205 and the optical fiber 208, and/or the diagnostic tool 200 may transmit the identification of the LMTU 202 to one or more wireless devices 228 via the wireless interface 225. For example, the diagnostic tool 200 may transmit the identification of the LMTU 202 to a portable computing device 125 operated by an agent of the PON 100 (e.g., via a direct wireless link), to another wireless device of the PON 100 (e.g., via a direct wireless link or a wireless network), etc. Of course, the diagnostic tool 200 may obtain other types of information from the LMTU 202 (e.g., statuses or states, etc.) and transmit the obtained information via the wireless interface 225 to one or more wireless devices 228.

Generally speaking, in some embodiments, the instructions 235 may be executable to cause the diagnostic tool 200 to select one or more of the output interfaces (e.g., the network-facing optical interface 205, one or more wireless interfaces 225, one of the communication interfaces 222, etc.) and cause information that is sensed, detected, determined, generated, and/or obtained by the diagnostic tool 200 to be delivered to one or more recipients (e.g., wireless devices 228, the OLT 102, the servers 130, the agent computing device 125, etc.) via the selected output interfaces. In some situations, the instructions 235 may be executable to cause the diagnostic tool 200 to select a particular wavelength band over which to transmit the outgoing information via the network-facing optical interface 205. For example, the diagnostic tool 200 may select one of the optical wavelength bands supported by the PON 100 (e.g., 100-400 nm, 630-670 nm, 1260-1280 nm, 1284-1288 nm, 1290-1310 nm, 1340-1344 nm, 1356-1360 nm, 1530-1565 nm, 1575-1581 nm, 1596-1603 nm, and/or 1613-1650 nm) to utilize in transmitting the outgoing information via the network-facing optical interface 205 and the optical fiber 208. In some situations, the instructions 235 may be executable to cause the diagnostic tool 200 to select one of the wireless frequency bands supported by the diagnostic tool 200 (e.g., 900 MHZ, 2.5 GHZ, 5.2 GHZ, and/or other RF frequency bands such as those used for NFC, Bluetooth, Wi-Fi, infrared, etc.) to utilize in transmitting the outgoing information via the appropriate wireless interface 225, or to select a wired communication protocol (e.g., IP or other type of packet protocol) to utilize in transmitting the outgoing information via the appropriate communication interface 222. The selection of the output interface (and optionally of the wavelength, frequency band, and/or communication protocol) may be based on, for example, a type of content or payload of the information obtained from the LMTU 202, the actual content or payload of the information obtained from the LMTU 202, a type of information sensed or determined by the diagnostic tool 200, the content or payload of the information sensed or determined by the diagnostic tool 200, a current status of optical and/or wireless networks and/or links, an identity of a recipient of the information, and/or other criteria.

With particular regard to the wireless devices 228 with which the in-line diagnostic tool 200 communicates via the wireless interface(s) 225, and to bolster the security of the PON 100, the in-line diagnostic tool 200 and a wireless device 228 may be paired together prior to communicating therebetween via the wireless interface 225. Further, the wireless device 228 may be authenticated and/or authorized to wirelessly communicate with the in-line diagnostic tool 200, and/or to wirelessly communicate via a wireless network of which both the in-line diagnostic tool 200 and the wireless device 228 are wireless nodes. As such, the computer-executable instructions 235 executing at the in-line diagnostic tool 200 may include instructions that are executable to pair, authenticate, and/or authorize the wireless device 228 with the in-line diagnostic tool 200 and/or with a wireless network of which the wireless device 228 and the in-line diagnostic tool 200 are wireless nodes. Still further, in some situations, the computer-executable instructions 235 executing at the in-line diagnostic tool 200 may additionally or alternatively include instructions that are executable to authenticate and/or authorize one or more applications or routines executing at the wireless device 228 with the in-line diagnostic tool 200. For example, a graphical user interface (GUI) and/or an augmented reality (AR) application executing at the wireless device 228 may be authenticated and/or authorized to communicate with the in-line diagnostic tool 200 via a wireless link supported by the wireless interface 225. It is noted that a wireless device 228 may be proximally located to the in-line diagnostic tool 200 (e.g., at the location of the LMTU serviced by the in-line diagnostic tool 200), or a wireless device 228 may be remotely located to the in-line diagnostic tool 200 and may communicatively connect to the in-line diagnostic tool 200 via one or more networks 128. Accordingly, the pairing, authenticating, and/or authorizing of the wireless device 228 and/or of applications executing on the wireless device 228 may be performed for the wireless device 228 and/or for the application(s) executing on the wireless device 228 as needed. For example, while a remotely-located wireless device 228 itself may not need to be paired with and authenticated/authorized with the in-line diagnostic tool 200, an application executing on the remotely-located wireless device 228 may be authenticated and/or authorized to communicate with the in-line diagnostic tool 200.

Example Method at an In-Line Diagnostic Tool

Figure 3:
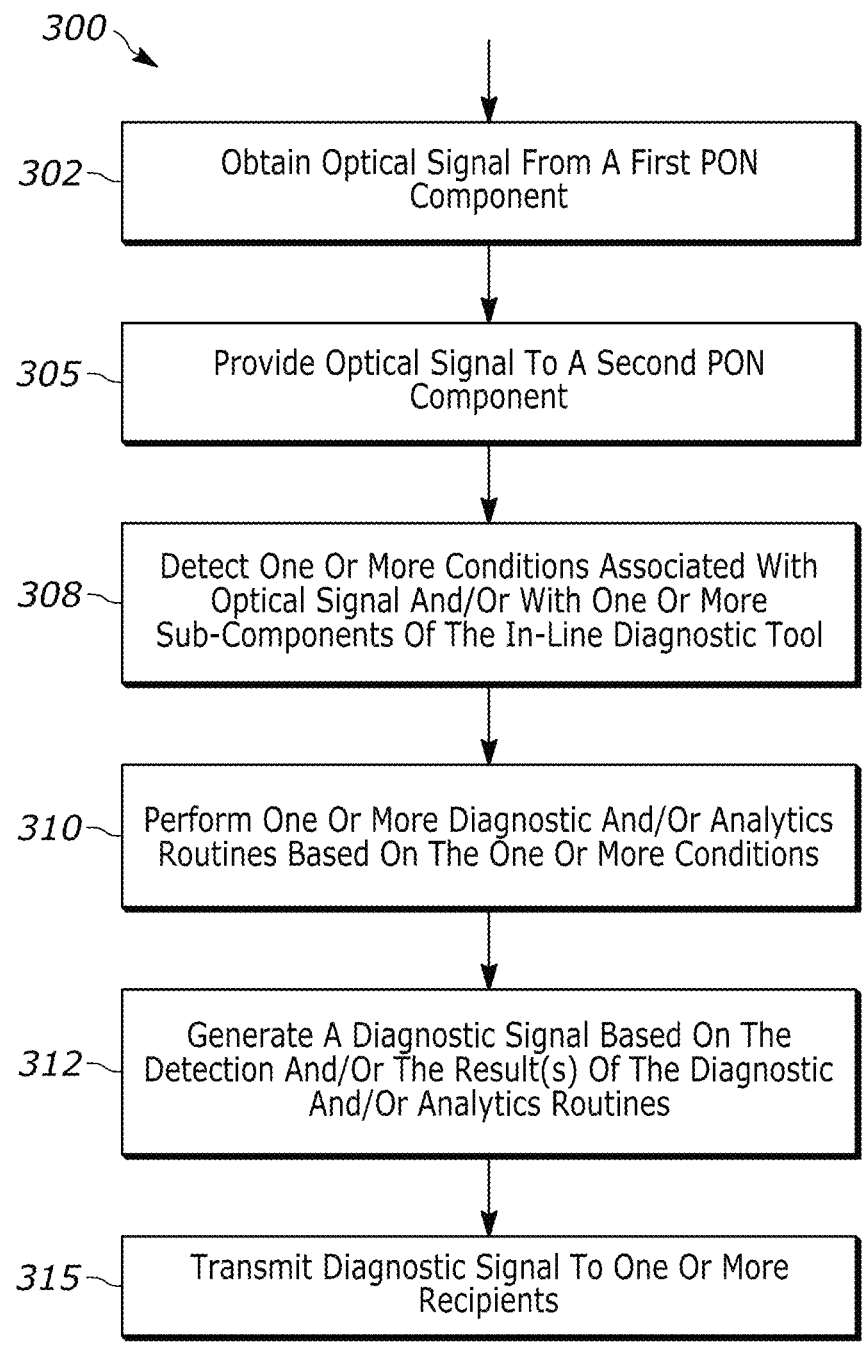
FIG. 3 depicts a flow diagram of an example method at an in-line diagnostic tool utilized in a passive optical network.

FIG. 3 depicts a flow diagram of an example method 300 at a coupling device or in-line diagnostic tool utilized in a passive optical network. For example, instances of the method 300 may be executed at one or more of the in-line diagnostic tools 120a, 120b, 120c, 120d of the PON 100 of FIG. 1, and/or the method 300 may be executed at the in-line diagnostic tool 200 of FIG. 2. In an example implementation, the set of instructions 235 stored on the one or more memories 232 of the in-line diagnostic tool 200 may be executable by the one or more processors 230 of the in-line diagnostic tool 200 to cause the in-line diagnostic tool to perform at least a portion of embodiments of the method 300. For ease of illustration, and not for limitation purposes, the method 300 is described with simultaneous reference to the PON 100 of FIG. 1 and the example in-line diagnostic tool 200 depicted in FIG. 2.

At a block 302, the method 300 includes obtaining, by the in-line diagnostic tool, an optical signal (e.g., obtaining at least one optical signal) that has been delivered to the in-line diagnostic tool over an optical fiber of the PON. Generally speaking, the in-line diagnostic tool may directly and optically couple two components of the PON, such as in manners described elsewhere with this document. Accordingly, the in-line diagnostic tool 200 may obtain the optical signal from a first (e.g., sending) component via a first optical interface 205 of the in-line diagnostic tool into which an optical fiber 208 of the PON is received. The optical interface 205 and the optical fiber 208 may directly and optically connect the in-line diagnostic tool 200 to the first PON component. Further, in some arrangements, the optical interface 205 and the optical fiber 208 may optically connect the in-line diagnostic tool 200 directly or remotely to an OLT 102, to one or more servers 130, and/or to one or more other components of the PON 100, for example.

At a block 305, the method 300 includes providing, by the in-line diagnostic tool, the obtained optical signal to a second (e.g., receiving or recipient) component of the PON. For example, referring to FIG. 2, the in-line diagnostic tool 200 may pass the obtained optical signal through the in-line diagnostic tool (e.g., as denoted by the reference 215), and may provide the optical signal to the receiving or recipient PON component (e.g., directly) via a second optical interface 218. The optical interface 218 and optical fiber or connector 219 received into the optical interface 218 may directly and optically connect the in-line diagnostic tool 200 and the recipient PON component, which is depicted in FIG. 2 as an LMTU 202. However, as discussed elsewhere within this document, the recipient PON component may be another type of component of the PON.

The optical signal that is obtained 302 by the in-line diagnostic tool via the first optical interface may include one or more optical signals of a first set of optical wavelengths. In some situations, though, the obtained optical signal may include respective one or more optical signals of at least one other set of optical wavelengths. For example, as previously discussed, different services that are provided to locations serviced by the PON may utilize different sets of optical wavelengths via which respective optical signals of the different services are delivered over the PON to and through the in-line diagnostic tool (and eventually, to a recipient LMTU).

In situations in which multiple optical signals are obtained 302 by the in-line diagnostic tool via multiple, different optical wavelength bands (e.g., via the first optical interface 205) and the receiving component is an LMTU 202, the method 300 may include passing a first set of optical signals of a first set of optical wavelengths through the in-line diagnostic tool (e.g., as denoted by the reference 215) and providing 305 the passed-through first set of optical signals to the LMTU 202 via the second optical interface 218 and optical fiber or connector 219. Additionally, in these situations, the method 300 may further include detecting, by the in-line diagnostic tool, the presence of a second set of optical signals that are received by the in-line diagnostic tool via the optical fiber, the first optical interface, and a second set of optical wavelengths. In an example, the first set of optical signals may be received by the in-line diagnostic tool over at least one of wavelengths between 1260-1543 nanometers or wavelengths between 1573-1650 nanometers, the second set of optical signals may be received by the in-line diagnostic tool over wavelengths between 1553-1565 nanometers. Accordingly, in situations in which multiple optical signals are obtained by the in-line diagnostic tool via the first optical interface 205 via multiple, different wavelength bands, the method 300 may include automatically tuning, by the in-line diagnostic tool, to the second set of wavelengths upon detection of the presence of the second set of optical signals being delivered via the second set of wavelengths. For example, the sensor 210 of the network-facing optical interface 205 may detect the presence of the second set of optical signals on the second set of wavelengths, and the tuner 212 may automatically tune the optical interface 205 to the second set of wavelengths. Upon detecting the presence of the second set of signals, in an embodiment the in-line diagnostic tool may convert (e.g., by utilizing the converter 220) the second set of optical signals to be of a non-optical RF wavelength, and may provide the converted, second set of optical signals to the last mile termination unit via the communication interface 222. Alternatively, in another embodiment, the in-line diagnostic tool may convert (e.g., by utilizing the converter 220) the second set of optical signals to be of the first set of wavelengths, and may provide the converted, second set of optical signals to the last mile termination unit via the second optical interface 218. At any rate, the LMTU 202 may receive, from the in-line diagnostic tool, both the first and second sets of optical signals, e.g., via the optical interface 218 and/or via the communication interface 222.

In situations in which multiple optical signals are obtained 302 by the in-line diagnostic tool via multiple, different optical wavelength bands (e.g., via the first optical interface 205) and the receiving component is not an LMTU 202, the method 300 may include passing the multiple optical signals (e.g., which have been received by the in-line diagnostic tool via any and all wavelength bands) through the in-line diagnostic tool (e.g., as denoted by the reference 215) and providing 305 the passed-through optical signals to the recipient PON component via the second optical interface 218 and the optical fiber or connector 219.

At a block 308, the method 300 includes detecting one or more conditions related to the received optical signal(s), the PON, and/or one or more sub-components of the in-line diagnostic tool itself. Sub-components of the in-line diagnostic tool may include, for example, the interfaces 205, 218, 222, 225, the processors 230, the sensors 210, the tuners 212, the memories 232, the data store 240, the converters 220, and/or other parts of the in-line diagnostic tool 200 (not depicted in FIG. 2) or portions thereof.

The one or more conditions may be detected 308 by the one or more sensor(s) 210 of the network-facing optical interface 205, by other sensors included in the in-line diagnostic tool (not shown in FIG. 2), by the instructions 235 (e.g., based on information provided to and/or generated by the processors 230 executing at least some of the instructions 235, 238), and/or by other sub-components of the diagnostic tool 200. The one or more conditions may include, for example, measurements, states, statuses, alerts, alarms, etc. of or pertaining to the received optical signals, the PON, and/or one or more sub-components of the in-line diagnostic tool. Additionally or alternatively, the one or more conditions may include, for example, the reception of control and/or test signals from other PON components and/or other types and content payload provided by other PON components (e.g., payload of optical services content and/or payload other than optical services content).

In some embodiments, detecting 308 the one or more conditions may include determining one or more characteristics of the received optical signal(s), the PON, and/or the one or more sub-components of the in-line diagnostic tool, e.g., by calculating and/or otherwise determining the presence of the one or more conditions based on data provided by the sensors 210 and/or the other sensors. For example, the in-line diagnostic tool 200 may determine characteristics of the received optical signal(s) such as frequency, amplitude, attenuation, signal strength, fidelity of payload contents, optical drift, and/or other characteristics of one or more received optical signals, e.g., at a single point in time and/or as a trend or otherwise over time. Additionally or alternatively, the in-line diagnostic tool 200 may determine one or more characteristics of the PON (such as, for example, optical drift, the availability or unavailability of payload signals, heartbeat signals, test signals, and the like, delays, fidelity of signals received via different wavelength bands, and/or other characteristics of the PON as observed or detected by the in-line diagnostic tool 200), e.g., at a single point in time and/or as a trend or otherwise over time. Still additionally or alternatively, the in-line diagnostic tool 200 may determine characteristics of one or more sub-components of the tool 200 itself (such as, for example, faults, alerts, alarms, overheating, performance and/or quality of service measurements, and/or other sub-component characteristics), e.g., at a single point in time and/or as a trend or otherwise over time. In some implementations, the in-line diagnostic tool 200 may determine one or more characteristics of the received optical signal(s), the PON, and/or the one or more sub-components of the tool 200 based on a combination of detected or determined conditions pertaining to the received optical signal(s), the PON, and/or the one or more sub-components of the tool 200. Of course, other conditions and/or characteristics may be detected, sensed, and/or measured, if desired. For example, in some embodiments (not shown), the detecting 308 of the one or more conditions by the in-line diagnostic tool may include predicting an occurrence of one or more conditions, an estimated time at which the predicted occurrence may take place, and a confidence level of the prediction.

In embodiments, the method 300 may optionally include performing 310, by the in-line diagnostic tool, one or more diagnostics, analyses, or analytics based on the one or more detected conditions which, as previously discussed, may include one or more measurements and/or characteristics of one or more received optical signals, of the PON, and/or one or more sub-components of the in-line diagnostic tool. In some implementations, the performing 310 of the one or more diagnostics, analyses, or analytics and the detecting 308 of the one or more conditions may be an integral step of the method 300. In some implementations, the performing 310 and the detecting 308 may be partially overlapping steps of the method 300, and in some implementations, the performing 310 and the detecting 308 may be distinct, separate steps of the method 300. At any rate, in an embodiment of the block 310, the in-line diagnostic tool may utilize the one or more detected conditions as inputs into one or more diagnostic routines. For example, the computer-executable instructions 235 may include instructions for one or more diagnostics routines which analyze one or more types of information sensed by the sensor 210 and/or of other sensors included in the diagnostic tool (e.g., in real-time and/or over time) and provide a corresponding result or output. Examples of different types of diagnostic routines which may be performed 310 by the in-line diagnostic tool may include averages, means, maximums, minimums, rates of change, etc. (e.g., in real-time and/or over time), and/or other types of deterministic and/or predictive analytics which may be performed 310 on various characteristics of and/or conditions related to the optical signal, to the PON, and/or to one or more sub-components of the in-line diagnostic tool. For instance, inputs into the various analyses performed 310 by the in-line diagnostic tool may include data indicative of the sensed conditions and/or characteristics of an optical signal either alone or in combination with data indicative of conditions and/or characteristics of other optical signals, data indicative of states and/or behavior of the PON (e.g., as observed or detected by the in-line diagnostic tool), data indicative of states of the diagnostic tool and/or subcomponents thereof, data indicative of results of test signals sent by and/or received at the in-line diagnostic tool, and/or other information that has been sensed, detected, calculated, or otherwise determined by the in-line diagnostic tool.

Results or outputs of the one or more executed diagnostic routines may include information such as raw (e.g., sensed) data; current states of the optical signals, of the PON (e.g., as observed or detected by the in-line diagnostic tool 200), and/or of various sub-components of the in-line diagnostic tool 200; determined or calculated data (such as data indicative of characteristics determined by the in-line diagnostic tool based on the raw data and/or the current states); the identification of optical signals, senders, and/or receivers of optical signals; data indicative of PON behavior that is out-of-range or has surpassed a threshold (e.g., a pre-determined threshold); data indicative of sub-component states and/or behaviors that are out-of-range and/or have surpassed a threshold (e.g., a pre-determined threshold); data indicative of the states and/or behaviors of the optical signal, the PON, sub-component states that are predicted to become out-of-range and/or surpass a threshold, etc.

At a block 312, the method 300 includes generating, by the in-line diagnostic tool, a diagnostic signal based on the detecting 308 (and optionally based on the performing 310 of the one or more diagnostic routines), and at a block 315, the method 300 includes transmitting, by the in-line diagnostic tool, the diagnostic signal to one or more recipients (e.g., one or more recipient devices and/or applications) via an output interface of the in-line diagnostic tool. The diagnostic signal may include payload that is indicative of information about or related to the detected one or more conditions. For example, the diagnostic signal may include one or more measurements and/or indications of one or more current conditions and/or characteristics of or pertaining to the optical signal, to the PON, and/or to one or more sub-components of the in-line diagnostic tool, and/or the diagnostic signal may include payload indicative of information about or related to time-series and/or trending behavior and/or states of or pertaining to the optical signal, to the PON, and/or to one or more sub-components of the in-line diagnostic tool. Additionally or alternatively, the diagnostic signal may include payload that is indicative of one or more results of one or more diagnostic routines that have been executed by the in-line diagnostic tool. For example, the diagnostic signal may include payload indicative of information about or related to detected and/or predicted behaviors and/or states of or pertaining to the optical signal, to the PON, and/or to one or more sub-components of the in-line diagnostic tool. In some situations, the diagnostic signal may include payload that includes identification information, such as an indication of a particular optical wavelength band, a particular sub-component of the in-line diagnostic tool, and/or other identifying information.

The one or more recipients of the diagnostic signal transmitted 315 by the in-line diagnostic tool 200 may include a recipient device and/or may include a recipient application executing on a device. Further, the output interface via which the in-line diagnostic tool transmits the diagnostic signal may be an optical interface (such as the optical interfaces 205, 218), a wired communication interface (such as wired interfaces included in the communication interfaces 222), or a wireless communication interface 225.

Example recipient devices of the diagnostic signal may include a portable electronic device 228 operated by an agent of the PON at the location where the in-line diagnostic tool 200 is disposed, a computing device 125 operated by an agent of the PON and communicatively connected to the in-line diagnostic tool via the networks 128, and/or the back-end servers 130 of the PON 100. An example recipient application may be a graphical user interface (GUI), augmented reality (AR), or other type of user interface application (e.g., executing at one of the devices 228, 125, 130) which continuously (e.g., over time) receives real-time diagnostic output signals from the in-line diagnostic tool 200, and presents a continuously-updated representation (e.g., in a graphical or AR representation) of the diagnostic information and/or results on a user interface. Another example recipient application may be a data management application executing at the back-end servers 130 which receives and stores the information provided by the diagnostic signal (e.g., in the data stores 132), e.g., for analyses in conjunction with other data collected from the PON 100. Still another example recipient application may be a higher-level analytics application (e.g., executing at the back-end servers 130) which receives the diagnostic signal from the in-line diagnostic tool 200 along with other real-time data from the PON 100 and generates a resulting real-time analytics output. Of course, other applications may be recipients of the diagnostic signal.

In some situations, the one or more recipients of the diagnostic signals transmitted 315 by the in-line diagnostic tool 200 may include another device included in or associated with the PON. For example, the one or more recipients of the diagnostic signal may be another in-line diagnostic tool, an in-line adaptor, a coupling device, or another PON component, a node of a wired or wireless communication network supporting the PON, a router within the communication network, etc. In these situations, a particular recipient device of a diagnostic signal generated 312 by the in-line diagnostic tool 200 may or may not be the intended end-recipient of the contents of the diagnostic signal. For example, a router or intermediate node of a wireless network supporting the PON may be the direct recipient of a diagnostic signal that is generated 312 and transmitted 315 by the in-line diagnostic tool 200, but the router or intermediate node may not be the intended end-recipient of the contents of the diagnostic signal and instead may forward or otherwise provide the contents to the intended end recipient. For example, an intermediate node of a wireless network may route the contents of a diagnostic signal received from the in-line diagnostic tool 200 over the wireless network to an intended end-recipient.

For in-line diagnostic tools 200 that include multiple output interfaces 205, 218, 222, 225, the method 300 may include selecting, from among the multiple output interfaces included in the in-line diagnostic tool, one or more specific output interfaces via which the generated diagnostic signal is transmitted 315 from the in-line diagnostic tool. For example, the in-line diagnostic tool 200 may include two or more wireless interfaces that respectively support NFC, Bluetooth, W-Fi, infrared, 900 MHz, 2.4 GHZ, or 5.2 GHz wireless transmissions, to name a few, and the in-line diagnostic tool may select a wireless interface from among the two or more wireless interfaces of the in-line diagnostic tool to utilize in transmitting 315 the diagnostic signal from the tool 200. In another example, the in-line diagnostic tool 200 may select both an optical output interface 205, 218 and a wireless output interface 225 to utilize in transmitting 315 diagnostic payload from the tool 200 via respective diagnostic signals. At any rate, the selecting of the one or more output interfaces may be based on, for example, a type of the payload of the diagnostic signal, a content of the payload of the diagnostic signal, current statuses and/or usages of the various optical, wired, and/or wireless links supported by the in-line diagnostic tool 200, an identity of the recipient device and/or recipient application, and/or other criteria. In some situations, the in-line diagnostic tool may transmit 315 the same diagnostic payload or content from the in-line diagnostic tool via multiple output interfaces to multiple different recipient devices and/or applications. For example, the in-line diagnostic tool may transmit an indication of diagnostic results via a Wi-Fi or Bluetooth wireless interface to a proximately-located portable computing device 125 (e.g., for viewing by an agent of the PON), and the in-line diagnostic tool may also transmit the indication of the diagnostic results via a 900 MHz wireless interface for delivery to the remote servers 130, e.g., for further analysis and/or long-term historization in the data store 132 of the PON 100. As such, the diagnostic tool 200 may transmit 315 a same diagnostic payload via respective diagnostic signals over multiple different output interfaces 205, 218, 222, 225, and/or the diagnostic tool 200 may transmit 315 different diagnostic payloads via different diagnostic signals (e.g., over a single output interface or over different output interfaces 205, 218, 222, 225).

In embodiments in which a recipient of the diagnostic signal is a wireless device or application executing on a wireless device, prior to the transmitting 315 of the wireless, diagnostic signal from the in-line diagnostic tool to the one or more recipient devices (and, in some cases, prior to transmitting any payload-bearing wireless signal from the in-line diagnostic tool to any of the one or more recipient devices), the method 300 may include at least one of pairing, authenticating, and/or authorizing at least some of the one or more recipient devices and/or applications executing thereon for communicating with the in-line diagnostic tool 200. In this manner, the security of the PON 100 may be protected against malicious intrusion by rogue wireless devices and/or by rogue applications executing on recipient wireless devices.

In some embodiments, the method 300 may include detecting, by the in-line diagnostic tool 200, one or more conditions associated with sub-components of the in-line diagnostic tool itself (e.g., sub-components 205, 210, 212, 215, 218, 220, 222, 225, 230, 232, 235, 238, 240 of the in-line diagnostic tool 200, and/or other sub-components of the diagnostic tool 200 which are not depicted in FIG. 2) and/or associated with the operations of the sub-components of the tool 200, and transmitting, by the in-line diagnostic tool, indications of the detected conditions to one or more recipients devices and/or applications via one or more output interface(s) 205, 218, 222, 225. For example, the in-line diagnostic tool 200 may detect a status, state, fault, level of performance, degradation of performance, and/or other condition of one or more sub-components of the in-line diagnostic tool, and the in-line diagnostic tool 200 may transmit an indication of the detected condition(s) to one or more wireless recipient devices 228 via suitable wireless interfaces 225, to an application executing at a device 125, 228 operated by an agent of the PON via a wireless interface 225, a wired interface 222, and/or optical interface 205, and/or to an application executing at the back-end servers 130 via the optical interface 205.

In some embodiments, the method 300 may include transmitting 315 (e.g., from the in-line diagnostic tool 200 via one or more of the output interfaces 205, 218, 222, 225) information that has been received or obtained by the in-line diagnostic tool from the LMTU 202, where the received information is included in the payload of the diagnostic signal. For example, the LMTU 202 may provide information about its status, diagnostic results, conditions detected at the LMTU 202, and/or other types of information to the in-line diagnostic tool 200 (e.g., via the optical interface 218 and/or via the communication interface 222), and the in-line diagnostic tool 200 may forward or otherwise provide the information provided by the LMTU 202 to one or more intended recipients via one or more diagnostic signals.

In some embodiments (not shown in FIG. 3), the method 300 may include receiving, at the in-line diagnostic tool 200, one or more instructions via one or more of the interfaces 205, 218, 222, 225. For example, the in-line diagnostic tool 200 may receive, via the wireless interface 255, a wireless signal from a portable electronic device 228 that is operated by an agent of the PON 100 at the location serviced by the LMTU 202, or from another wireless device of the PON 100 which is networked to the servers 130 of the PON 100. In another example, the in-line diagnostic tool 200 may receive, via a wired communication interface 222 or via the optical interface 205, an instruction for the in-line diagnostic tool 200, such as a request for diagnostic data and/or other diagnostic information; an instruction for the in-line diagnostic tool 200 to perform or schedule a diagnostic, analytic, administrative, or other type of function; an instruction to change a setting or parameter value for a scheduled diagnostic routine; etc. As such, in these embodiments, generating 312 the diagnostic signal may include generating a diagnostic signal having payload responsive to the received instruction, and transmitting 315 the diagnostic signal may include transmitting the generated diagnostic signal to the instructing application or device, e.g., via one or more output interfaces 205, 218, 222, 225.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. An in-line diagnostic tool utilized in a passive optical network (PON), the in-line diagnostic tool comprising: a first optical interface via which an optical fiber of the PON is received at the in-line diagnostic tool, and via which the in-line diagnostic tool receives at least one optical signal; a second optical interface that optically couples the in-line diagnostic tool to a component of the PON that is a recipient of the at least one optical signal; one or more sensors that detect one or more conditions of the at least one optical signal; and one or more processors operable to cause a diagnostic signal including information indicative of the detected one or more conditions to be generated and transmitted from the in-line diagnostic tool via an output interface of the in-line diagnostic tool.

2. The in-line diagnostic tool of example 1, wherein the output interface is the first optical interface.

3. The in-line diagnostic tool of example 2, wherein the first optical interface supports a plurality of different sets of wavelengths, and the diagnostic signal is transmitted via a selected set of wavelengths included in the plurality of different sets of wavelengths.

4. The in-line diagnostic tool of example 1, further comprising one or more wireless interfaces, and wherein: the output interface is a wireless interface included in the one or more wireless interfaces; and the diagnostic signal is transmitted from the in-line diagnostic tool via the wireless interface to another device.

5. The in-line diagnostic tool of example 4, wherein the one or more wireless interfaces support at least one of: a near-field communication (NFC) wireless link, a 2.4 GHz radio link, a 900 MHz radio link, a Wi-Fi link, or a Bluetooth wireless link.

6. The in-line diagnostic tool of example 4, wherein the another device is a portable computing device disposed at a location at which the in-line diagnostic tool is disposed.

7. The in-line diagnostic tool of example 6, wherein the location at which the in-line diagnostic tool is disposed is a location serviced by the PON, and the component of the PON that is the recipient of the at least one optical signal is a last mile termination unit disposed at the serviced location.

8. The in-line diagnostic tool of example 4, wherein the in-line diagnostic tool is a first node of a wireless network, and the another device is a second node of the wireless network.

9. The in-line diagnostic tool of example 1, wherein the in-line diagnostic tool includes a plurality of output interfaces, and the plurality of output interfaces includes at least two of: a first set of wavelengths supported by the first optical interface, a second set of wavelengths supported by the first optical interface, a wireless interface, or a wired interface.

10. The in-line diagnostic tool of example 9, wherein the one or more processors are operable to at least one of: select the output interface from the plurality of output interfaces; or cause the diagnostic signal to be transmitted via more than one output interface of the in-line diagnostic tool.

11. The in-line diagnostic tool of example 9, wherein the one or more processors are operable to cause a plurality of diagnostic signals to be generated and transmitted from the in-line diagnostic tool via different output interfaces of the plurality of output interfaces.

12. The in-line diagnostic tool of example 1, wherein the in-line diagnostic tool is communicatively coupled to a display upon which a visualization indicative of the one or more conditions is presented, and the visualization is generated based on the diagnostic signal.

13. The in-line diagnostic tool of example 12, wherein the one or more processors are operable to generate the visualization based on the diagnostic signal.

14. The in-line diagnostic tool of example 1, further comprising an input interface via which instructions corresponding to the one or more conditions are received, and the one or more processors are operable to modify the generation of the diagnostic signal based on the instructions.

15. The in-line diagnostic tool of example 14, wherein the input interface is the first optical interface, a wireless interface, or a user interface of the in-line diagnostic tool.

16. The in-line diagnostic tool of example 1, further comprising a pass-through component optically connecting the first optical interface to the second optical interface.

17. The in-line diagnostic tool of example 1, wherein the recipient of the at least one optical signal is an optical line terminal (OLT), a fiber distribution hub, an optical repeater, or a last mile termination unit.

18. A method at an in-line diagnostic tool utilized in a passive optical network (PON), the method comprising: obtaining, by the in-line diagnostic tool, at least one optical signal via a first optical interface of the in-line diagnostic tool via which an optical fiber is received; providing, via a second optical interface of the in-line diagnostic tool, the at least one optical signal to a component of the PON that is a recipient component of the at least one optical signal; detecting, via one or more sensors of the in-line diagnostic tool, one or more conditions of the at least one optical signal; generating, by the in-line diagnostic tool, a diagnostic signal including information indicative of the detected one or more conditions; and transmitting, by the in-line diagnostic tool, the diagnostic signal to at least one recipient via an output interface of the in-line diagnostic tool.

19. The method of example 18, wherein the transmitting of the diagnostic signal to the at least one recipient includes transmitting the diagnostic signal to the at least one recipient via at least one of: a first set of wavelengths supported by the first optical interface, a second set of wavelengths supported by the first optical interface, a wireless interface, or a wired interface of the in-line diagnostic tool.

20. The method of example 19, wherein the in-line diagnostic tool includes a plurality of output interfaces, and the plurality of output interfaces includes two or more of: the first set of wavelengths supported by the first optical interface, the second set of wavelengths supported by the first optical interface, the wireless interface, or the wired interface of the in-line diagnostic tool.

21. The method of example 20, wherein the transmitting of the diagnostic signal to the at least one recipient includes transmitting the diagnostic signal to the at least one recipient via more than one output interface.

22. The method of example 20, further comprising selecting, by the in-line diagnostic tool, the output interface from the plurality of output interfaces.

23. The method of example 20, further comprising generating a plurality of diagnostic signals and causing each diagnostic signal included in the plurality of diagnostic signals to be transmitted from the in-inline diagnostic tool via a different output interface.

24. The method of example 20, wherein the plurality of output interfaces includes at least one of: a plurality of different sets of wavelengths supported by the first optical interface; or a plurality of wireless interfaces, the plurality of wireless interfaces supporting two or more of: a near-field communication (NFC) wireless link, a 2.4 GHz radio link, a 900 MHz radio link, a Wi-Fi link, or a Bluetooth wireless link.

25. The method of example 18, further comprising generating a visualization indicative of the detected one or more conditions and causing the visualization to be presented on a display that is communicatively connected to the in-line diagnostic tool.

26. The method of example 18, further comprising passing through the at least one optical signal from the first optical interface to the second optical interface.

27. The method of example 26, wherein the recipient component of the at least one optical signal is a last-mile termination unit disposed at a location serviced by the PON, a fiber distribution hub, an optical repeater, or an optical line terminal (OLT), and the second optical interface directly and optically connects the in-line diagnostic tool to the recipient component.

28. The method of example 18, further comprising: receiving, via an input interface of the in-line diagnostic tool, instructions corresponding to the one or more conditions; and wherein the generating of the diagnostic signal is responsive to the instructions, or the method further comprises modifying the diagnostic signal based on the instructions.

29. The method of example 28, wherein the input interface is the first optical interface, a wireless interface, or a user interface of the in-line diagnostic tool.

30. The method of example 18, wherein the at least one recipient includes at least one of: a portable computing device, a wireless network node, a back-end server of the PON, or a user interface application.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fiber distribution terminal (FDT) of a passive optical network (PON), the FDT comprising:
 a first optical interface via which the FDT is optically connected to a central office of the PON;
 a plurality of second optical interfaces via which the FDT is optically and directly connected to a plurality of last mile termination units (LMTUs) of the PON; and
 an in-line diagnostic tool, including:
  one or more processors operable to:
   select an output interface from a plurality of output interfaces included in the FDT, the selected output interface including at least one of: a first output interface supporting a first set of wavelengths supported by at least one of the first optical interface or the plurality of second optical interfaces, a second output interface supporting a second set of wavelengths supported by the at least one of the first optical or the plurality of second optical interfaces, a wireless interface, or a wired interface; and
   cause a diagnostic signal including information indicative of one or more conditions corresponding to the FDT and detected via one or more sensors to be transmitted from the FDT via the selected output interface of the FDT.

2. The FDT of claim 1, wherein the selected output interface is the first set of wavelengths supported by the first optical interface.

3. The FDT of claim 2, wherein the first optical interface supports a plurality of different sets of wavelengths, and the diagnostic signal is transmitted via a selected set of wavelengths included in the plurality of different sets of wavelengths.

4. The FDT of claim 1, further comprising one or more wireless interfaces, and wherein:
 the selected output interface is a particular wireless interface included in the one or more wireless interfaces;
 the diagnostic signal is transmitted from the FDT via the particular wireless interface to another device; and the one or more wireless interfaces support at least one of: a near-field communication (NFC) wireless link, a 2.4 GHz radio link, a 900 MHz radio link, a Wi-Fi link, a Bluetooth wireless link, or another type of wireless link.

5. The FDT of claim 4, wherein:
the another device is a portable computing device disposed at a location at which the FDT is disposed; or
the FDT is a first node of a wireless network and the another device is a second node of the wireless network.

6. The FDT of claim 1, wherein the plurality of output interfaces includes at least two of: the first set of wavelengths supported by the at least one of the first optical interface or the plurality of second optical interfaces, the second set of wavelengths supported by the at least one of the first optical interface or the plurality of second optical interfaces, the wireless interface, or the wired interface.

7. The FDT of claim 1, wherein the one or more processors are operable to cause the diagnostic signal to be transmitted from the FDT via more than one output interface of the FDT.

8. The FDT of claim 1, wherein the one or more processors are operable to cause a plurality of diagnostic signals to be transmitted from the FDT via the plurality of output interfaces.

9. The FDT of claim 1, wherein the one or more processors are operable to cause the diagnostic signal to be transmitted to multiple recipients.

10. The FDT of claim 1, wherein the FDT is communicatively coupled to a display upon which a visualization indicative of the one or more conditions is presented, and the visualization is generated based on the diagnostic signal.

11. The FDT of claim 1, wherein the one or more processors are operable to generate the diagnostic signal.

12. The FDT of claim 1,
further comprising an input interface via which instructions corresponding to the one or more conditions are received; and
wherein the transmission of the diagnostic signal is responsive to the received instructions.

13. The FDT of claim 1, wherein the one or more conditions include a condition of the optical signal received at the FDT via the first optical interface.

14. The FDT of claim 1, wherein the one or more conditions include a condition of the one or more optical signals provided by the FDT to at least some of the plurality of LMTUs via the plurality of second optical interfaces.

15. The FDT of claim 1, wherein a first optical fiber received at the first optical interface optically connects the FDT to at least one of a fiber distribution hub (FDH) or an optical line terminal (OLT) of the PON.

16. The FDT of claim 1, further comprising the one or more sensors.

17. The FDT of claim 1, wherein:
the one or more sensors detect at least one of: one or more characteristics of the PON or one or more characteristics of one or more sub-components of the FDT; and
the diagnostic signal further includes information indicative of at least one of: the one or more characteristics of the PON or the one or more characteristics of the one or more sub-components of the FDT.

18. A method at fiber distribution terminal (FDT) of a passive optical network (PON), the method comprising:
obtaining, by the FDT, an optical signal via a first optical interface of the FDT via which the FDT is optically connected to a central office of the PON;
providing, by the FDT and via a plurality of second optical interfaces via which the FDT is optically and directly connected to a plurality of last mile termination units (LMTUs) of the PON, one or more optical signals to one or more LMTUs of the plurality of the LMTUs of the PON;
selecting, by an in-line diagnostic tool of the FDT, an output interface from a plurality of output interfaces included in the FDT, the selected output interface including at least one of: a first output interface supporting a first set of wavelengths supported by the first optical interface or the plurality of second optical interfaces, a second output interface supporting a second set of wavelengths supported by the first optical interface or the plurality of second optical interfaces, a wireless interface, or a wired interface; and
transmitting, by the in-line diagnostic tool and to at least one recipient via the selected output interface of the FDT, a diagnostic signal including information indicative of one or more conditions corresponding to the FDT and detected via one or more sensors.

19. The method of claim 18, wherein the transmitting of the diagnostic signal to the at least one recipient via the selected output interface includes transmitting the diagnostic signal to the at least one recipient via more than one output interface.

20. The method of claim 18, wherein the transmitting of the diagnostic signal to the at least one recipient via the selected output interface includes transmitting the diagnostic signal to multiple recipients.

21. The method of claim 18, further comprising transmitting a plurality of diagnostic signals from the FDT.

22. The method of claim 18, wherein the plurality of output interfaces includes at least one of:
a plurality of different sets of wavelengths supported by the first optical interface; or
a plurality of wireless interfaces, the plurality of wireless interfaces supporting two or more of: a near-field communication (NFC) wireless link, a 2.4 GHz radio link, a 900 MHz radio link, a Wi-Fi link, or a Bluetooth wireless link.

23. The method of claim 18, further comprising causing a visualization indicative of the one or more conditions to be presented on a display that is communicatively connected to the FDT.

24. The method of claim 18,
further comprising receiving, via an input interface of the FDT, instructions corresponding to the one or more conditions; and
wherein one of:
the transmitting of the diagnostic signal is responsive to the instructions; or
the method further comprises modifying the diagnostic signal based on the instructions.

25. The method of claim 18, wherein the at least one recipient includes at least one of: a portable computing device, a wireless network node, a back-end server of the PON, or a user interface application.

26. The method of claim 18, further comprising, generating, by the in-line diagnostic tool of the FDT, the diagnostic signal.

27. The method of claim 18, further comprising detecting the one or more conditions via the one or more sensors.

28. The method of claim 18, wherein the diagnostic signal further includes information indicative of the at least one of: one or more characteristics of the PON or one or more characteristics of one or more sub-components of the FDT.

29. The method of claim 18, wherein the one or more conditions include at least one of: a condition of the optical signal received at the FDT via the first optical interface, or a condition of the one or more optical signals provided by the FDT to the plurality of LMTUs via the plurality of second optical interfaces.

30. The method of claim 18, wherein the first optical fiber optically connects the FDT to at least one of: a fiber distribution hub (FDH) or an optical line terminal (OLT) of the PON.

\* \* \* \* \*